(12) United States Patent
Brubaker

(10) Patent No.: US 10,358,118 B2
(45) Date of Patent: Jul. 23, 2019

(54) CONTROLLER FOR CONTROLLING A VEHICLE STOP LIGHT

(71) Applicant: Bendix Commercial Vehicle Systems LLC, Elyria, OH (US)

(72) Inventor: Christopher L Brubaker, Lakewood, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 0 days.

(21) Appl. No.: 15/212,714

(22) Filed: Jul. 18, 2016

(65) Prior Publication Data

US 2018/0015873 A1 Jan. 18, 2018

(51) Int. Cl.
*B60T 7/04* (2006.01)
*B60Q 1/30* (2006.01)
*B60Q 1/44* (2006.01)

(52) U.S. Cl.
CPC .............. *B60T 7/042* (2013.01); *B60Q 1/305* (2013.01); *B60Q 1/44* (2013.01)

(58) Field of Classification Search
CPC .......... B60Q 1/441; B60Q 1/30; B60Q 1/305; B60Q 1/44; B62D 63/08; B60T 7/042
See application file for complete search history.

(56) References Cited

U.S. PATENT DOCUMENTS

| | | | |
|---|---|---|---|
| 4,005,313 A | 1/1977 | Tibbits | |
| 4,006,453 A | 2/1977 | Bryant | |
| 4,109,968 A * | 8/1978 | Wood | B60Q 1/44 303/40 |
| 4,478,459 A * | 10/1984 | Cumming | B60T 13/683 303/15 |
| 4,856,850 A | 8/1989 | Aichele et al. | |
| 5,083,274 A * | 1/1992 | Bezos | G01D 9/00 246/182 R |

(Continued)

FOREIGN PATENT DOCUMENTS

| | | |
|---|---|---|
| CN | 204870719 | 12/2015 |
| JP | 3745127 B2 | 2/2006 |

*Primary Examiner* — Nay Tun
(74) *Attorney, Agent, or Firm* — Brian E. Kondas; Cheryl L. Greenly; Eugene E. Clair

(57) ABSTRACT

A controller includes a foot brake valve electrical input port, which is capable of receiving an electrical signal indicative of a foot brake delivery pressure, and a trailer brake valve electrical input port, which is capable of receiving an electrical signal indicative of a trailer brake delivery pressure. The controller also includes control logic that is capable of receiving the electrical signal indicative of the foot brake delivery pressure, receiving the electrical signal indicative of the trailer brake delivery pressure, based on an electrical level of the electrical signal indicative of the foot brake delivery pressure, determining if the foot brake delivery pressure is above a predetermined threshold pressure, and based on a presence of the electrical signal indicative of the trailer brake delivery pressure, determining if the trailer brake delivery pressure is above the predetermined threshold pressure. The controller also includes control logic that is capable of transmitting a signal from an electrical stop light control port for controlling a vehicle stop light based on the electrical signal indicative of the foot brake delivery pressure and the electrical signal indicative of the trailer brake delivery pressure.

24 Claims, 2 Drawing Sheets

(56) References Cited

U.S. PATENT DOCUMENTS

| | | | |
|---|---|---|---|
| 5,116,107 A | 5/1992 | Hull et al. | |
| 5,378,054 A * | 1/1995 | Eberling | B60Q 1/44 |
| | | | 213/76 |
| 5,719,552 A | 2/1998 | Thompson | |
| 6,039,410 A | 3/2000 | Robertson et al. | |
| 6,068,352 A | 5/2000 | Kulkarni et al. | |
| 6,452,489 B1 | 9/2002 | Ehrlich | |
| 6,501,376 B2 * | 12/2002 | Dieckmann | B60D 1/62 |
| | | | 303/122.02 |
| 6,587,044 B2 * | 7/2003 | Ehrlich | B60Q 1/448 |
| | | | 180/282 |
| 6,693,526 B1 | 2/2004 | Puccio | |
| 8,651,585 B2 | 2/2014 | Kaminski et al. | |
| 9,061,671 B2 | 6/2015 | Brubaker et al. | |
| 9,114,789 B2 | 8/2015 | Cellura et al. | |
| 2002/0166378 A1 * | 11/2002 | Bilinski | G01F 23/18 |
| | | | 73/299 |
| 2003/0168908 A1 | 9/2003 | Robinson et al. | |
| 2004/0187674 A1 * | 9/2004 | Bennett | B60T 13/263 |
| | | | 91/418 |
| 2006/0097569 A1 * | 5/2006 | Eberling | B60T 8/323 |
| | | | 303/122.15 |
| 2008/0157955 A1 | 7/2008 | Wichmann | |
| 2010/0168974 A1 * | 7/2010 | Bradley, IV | B60T 7/122 |
| | | | 701/70 |
| 2010/0271189 A1 * | 10/2010 | Miller | B60C 23/009 |
| | | | 340/431 |
| 2014/0246974 A1 * | 9/2014 | Motts | B60Q 1/305 |
| | | | 315/77 |
| 2014/0307461 A1 | 10/2014 | Huang | |

* cited by examiner

_US 10,358,118 B2_

CONTROLLER FOR CONTROLLING A VEHICLE STOP LIGHT

BACKGROUND

The present invention relates to a braking control system on a vehicle. It finds particular application in conjunction with controlling activation of a stop lamp and will be described with particular reference thereto. It will be appreciated, however, that the invention is also amenable to other applications.

An operator (e.g., driver) of an articulated vehicle (e.g., truck) typically has two methods of demanding application of trailer service brakes. The first method involves applying a pedal of a foot brake valve, which demands application of both tractor and trailer service brakes. The second method involves operating a hand brake valve located in a cab of the tractor, which only demands application of the trailer service brakes. The first and second methods may be used independent of each other. In other words, the operator of the vehicle may use the first method and/or the second method to apply the trailer service brakes.

Conventionally, respective pneumatic pressures (e.g., pneumatic signals) at delivery ports of the primary foot brake valve and the secondary foot brake valve are fluidly communicated to a first supply port of a double-check valve, and the pneumatic pressure (e.g., pneumatic signal) at a delivery port of the hand brake valve is fluidly communicated with a second supply port of the double-check valve. The higher of the respective pneumatic pressures (e.g., pneumatic signals) at the first and second supply ports of the double-check valve are fluidly communicated to both an electro/pneumatic stop light switch, which controls activation of the vehicle stop lights, and a trailer supply line for controlling the trailer service brakes. The pneumatic stop light switch activates the vehicle stop lights whenever the pneumatic pressure (e.g., pneumatic signal) received from the double-check valve is at least a predetermined pressure (e.g., 4 psi) and deactivates the vehicle stop lights whenever the pneumatic pressure (e.g., pneumatic signal) received from the double-check valve is less than the predetermined pressure. Therefore, the vehicle stop lights are activated based on the highest of three (3) pneumatic signals.

Upcoming regulation mandates will require electronic sensing of foot brake valve driver demand on all trailer towing vehicles. Electronically sensing foot brake valve driver demand will reduce the utility of activating a stop light switch based on the highest of three (3) pneumatic signals. Instead, the vehicle stop lights will be activated based on only a single electronic signal that indicates if either or both of the primary and secondary foot brake valves are activated to produce the predetermined pressure. Therefore, electronically sensing foot brake valve driver demand will likely reduce, or even eliminate, the use of the above described electro/pneumatic stop light switch.

The present invention provides a new and improved apparatus and method for controlling the vehicle stop lights.

SUMMARY

In one aspect of the present invention, it is contemplated that a controller includes a foot brake valve electrical input port, which is capable of receiving an electrical signal indicative of a foot brake delivery pressure, and a trailer brake valve electrical input port, which is capable of receiving an electrical signal indicative of a trailer brake delivery pressure. The controller also includes control logic that is capable of receiving the electrical signal indicative of the foot brake delivery pressure, receiving the electrical signal indicative of the trailer brake delivery pressure, based on an electrical level of the electrical signal indicative of the foot brake delivery pressure, determining if the foot brake delivery pressure is above a predetermined threshold pressure, and based on a presence of the electrical signal indicative of the trailer brake delivery pressure, determining if the trailer brake delivery pressure is above the predetermined threshold pressure. The controller also includes control logic that is capable of transmitting a signal from an electrical stop light control port for controlling a vehicle stop light based on the electrical signal indicative of the foot brake delivery pressure and the electrical signal indicative of the trailer brake delivery pressure.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
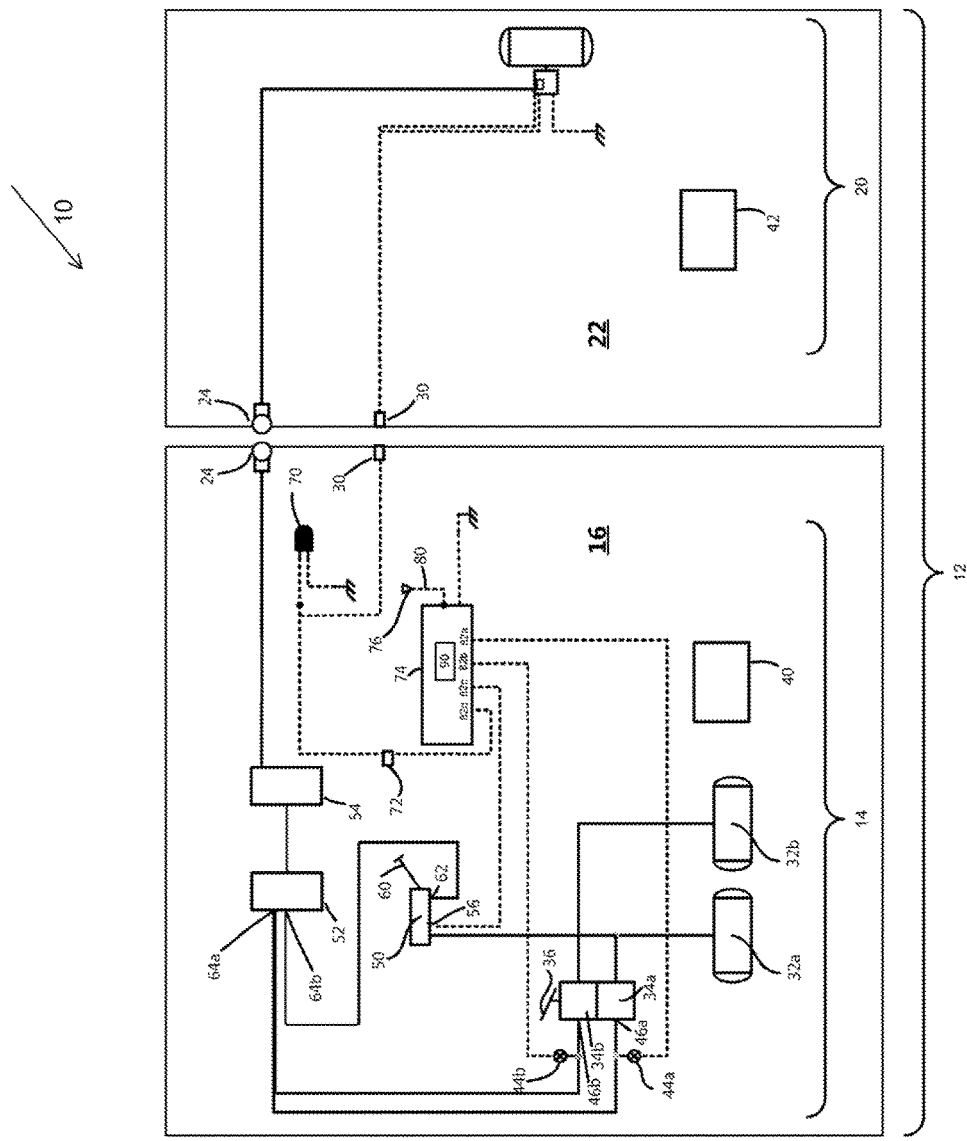
FIG. 1 illustrates a simplified component diagram of an exemplary tractor-trailer braking system in accordance with one embodiment of an apparatus illustrating principles of the present invention.

With reference to FIG. 1, a simplified component diagram of an exemplary tractor-trailer braking system 10 of a vehicle 12 is illustrated in accordance with one embodiment of the present invention. The braking system 10 includes a tractor braking system 14, which is on a tractor portion 16 of the vehicle 12, and a trailer braking system 20, which is on a trailer portion 22 of the vehicle 12. The tractor braking system 14 is pneumatically coupled to the trailer braking system 20 through gladhands 24 and electrically coupled to the trailer braking system 20 through electrical connectors 30.

The tractor braking system 14 includes reservoirs 32a, 32b (collectively, 32). The reservoirs 32a, 32b contain pressurized air for use in the tractor braking system 14.

The tractor braking system 14 includes a foot brake valve 34, which communicates pneumatically with the reservoirs 32. The driver depresses a pedal 36 of the foot brake valve 34 to apply both tractor service brakes 40 of the tractor braking system 14 and trailer service brakes 42 of the trailer braking system 20. Air from the reservoirs 32 is delivered to other braking components (not shown) in order to slow down and stop the vehicle 12. Actuation of the foot brake valve 34 will apply both the tractor service brakes 40 and the trailer service brakes 42.

Pressure sensors 44a, 44b (collectively 44) are associated with respective first (e.g., primary) and second (e.g., secondary) circuits 34a, 34b of the foot brake valve 34. The pressure sensors 44a, 44b measure delivery pressures in respective delivery ports 46a, 46b of the first (e.g., primary) and second (e.g., secondary) circuits 34a, 34b of the foot brake valve 34 when the foot brake valve 34 is actuated. Although the pressure sensors 44a, 44b are illustrated as external to the first (e.g., primary) and second (e.g., secondary) circuits 34a, 34b of the foot brake valve 34, it is to be understood that one or more of the pressure sensors 44a, 44b may also be internal to the first (e.g., primary) and second (e.g., secondary) circuits 34a, 34b of the foot brake valve 34. The pressure sensors 44a, 44b transmit signals indicative of the delivery pressures in the respective delivery ports 46a, 46b. For example, the pressure sensors 44a, 44b transmit electronic signals indicative of the delivery pressures in the respective delivery ports 46a, 46b.

The tractor braking system 14 includes a trailer brake valve 50 (e.g., a trailer hand control valve) which, in the illustrated embodiment, pneumatically communicates with the first reservoir 32a. The trailer brake valve 50 also pneumatically communicates with a double-check valve 52 and a tractor protection valve 54. The driver manually actuates the trailer brake valve 50 to only apply the trailer service brakes 42. Some reasons to apply only the trailer service brakes 42 include to hold the trailer portion 22 when the trailer is being coupled to the tractor portion 16 and to assist preventing the vehicle 12 from rolling backwards when stopped on a hill. A trailer brake valve position sensor 56 (e.g., switch) indicates a position of the of the trailer brake valve 50. For example, the trailer brake valve sensor 56 is an electrical switch that indicates when the driver has manually actuated the trailer brake valve 50 to a position that has previously been determined to create a predetermined level of trailer service brake delivery pressure (e.g., four (4) psi).

In one embodiment, the trailer brake valve 50 includes a movable control 60 (e.g., an actuator or a handle) that is manually moved (e.g., rotated) and positioned by an operator of the vehicle 12 when it is desired to supply pressure to the trailer service brakes. Similarly, it is contemplated that the trailer brake valve sensor 56 is a rotational sensor (e.g., a rotational switch) that indicates a rotational position of the trailer brake valve 50 actuator (e.g., handle). The movable control 60 (e.g., handle) is moved to control service brake pressure in a pneumatic trailer brake valve delivery port 62 of the trailer brake valve 50. A rotational position of the handle of the trailer brake valve 50 at which a predetermined threshold pressure is present in the pneumatic delivery port 62 of the trailer brake valve 50 is previously identified.

The tractor braking system 14 includes the double-check valve 52 and the tractor protection valve 54 that receive pressure from the foot brake valve 34 and/or the trailer brake valve 50 and transmit the service brake pressure to the trailer braking system 20 as service brake delivery pressure delivered from the tractor protection valve 54. In other words, a supply port 64a of the double-check valve 52 fluidly communicates with the respective delivery ports 46a, 46b of the first (e.g., primary) and second (e.g., secondary) circuits 34a, 34b of the foot brake valve 34; and a supply port 64b of the double-check valve 52 fluidly communicates with the delivery port 62 of the trailer brake valve 50.

The tractor-trailer braking system 10 also includes a stop light 70, a power relay 72 electrically controlling the stop light 70, and an electronic control unit (ECU) 74 (e.g., a controller). A vehicle power supply 76 (e.g., a vehicle battery) provides electrical power to the pressure sensors 44a, 44b, the trailer brake valve sensor 56, the power relay 72 (e.g., for powering the stop light 70), and the ECU 74 via respective electrical connections (not all of which are shown) to a vehicle communication bus 80 (e.g., a J1939 bus) or, alternatively, via respective direct electrical connections not involving the vehicle communication bus 80.

The ECU 74 includes respective electrical communication ports 82a, 82b, 82c, 82d (collectively 82) electrically connected to the pressure sensors 44a, 44b, the trailer brake valve sensor 56, and the power relay 72. In one embodiment, the electrical communication ports 82 electrically communicate with the pressure sensors 44a, 44b, the trailer brake valve sensor 56, and the power relay 72 via the vehicle communication bus 80. Alternatively, in other embodiments, it is also contemplated that the electrical communication ports 82 directly electrically communicate with the pressure sensors 44a, 44b, the trailer brake valve sensor 56, and the power relay 72 without involving the vehicle communication bus 80.

It is contemplated that the electrical communication ports 82a, 82b are electrical input ports that receive electrical signals from the pressure sensors 44a, 44b indicative of a foot brake application and, therefore, pressure in at least one of the respective delivery ports 46a, 46b of the first (e.g., primary) and second (e.g., secondary) circuits 34a, 34b of the foot brake valve 34. In one example, the electrical communication port 82a receives electrical signals from the pressure sensor 44a and the electrical communication port 82b receives electrical signals from the pressure sensor 44b. Also, the electrical communication port 82c is an electrical input port that receives electrical signals from the trailer brake valve sensor 56 indicative of the position of the of the handle 60 of the trailer brake valve 50. In addition, the electrical communication port 82d transmits electrical signals to the power relay 72 for controlling activation of the stop light 70.

The electrical communication ports 82a, 82b are referred to as respective foot brake valve electrical input ports. The electrical communication port 82c is referred to as a trailer brake valve electrical input port. The electrical communication port 82d is referred to as an electrical stop light control port.

In one embodiment, the respective electrical signals received at the electrical communication ports 82a, 82b from the pressure sensors 44a, 44b are an electrical level that indicate the foot brake application and, consequently, the delivery pressures in at least one of the respective delivery ports 46a, 46b of the first (e.g., primary) and second (e.g., secondary) circuits 34a, 34b of the foot brake valve 34. In one embodiment, it is contemplated that the electrical level is a voltage measured in Volts. It is further contemplated that the voltages transmitted from the respective pressure sensors 44a, 44b—and received by the electrical communication ports 82a, 82b—are in a range of about 0.5 Volts to about 4.5 Volts. In one example, the about 4.0 Volts range (e.g., about 4.5 Volts-about 0.5 Volts) linearly represents the respective pressures in the delivery ports 46a, 46b in the range of about 0 psi to about 150 psi. Therefore, the ECU determines (e.g., calculates) the respective pressures in the delivery ports 46a, 46b as:

Pressure (psi)=(37.5*Voltage (Volts))−18.75.

Therefore, the electrical communication ports 82a, 82b of the ECU 74 are capable of receiving respective electrical signals indicative of a delivery pressure in the respective delivery ports 46a, 46b of the first (e.g., primary) and second (e.g., secondary) circuits 34a, 34b of the foot brake valve 34. For example, if the voltage received by either of the electrical communication ports 82a, 82b is about 0.6067 Volts, the delivery pressure in the respective delivery port 46a, 46b is determined to be about 4 psi.

In one embodiment, the electrical signal received at the electrical communication port 82c from the trailer brake valve switch 56 is binary (e.g., either off (not present) or on (present)). If the position of the trailer brake valve 50 is before the rotational position that was previously identified to produce the predetermined threshold pressure at the pneumatic delivery port 62 of the trailer brake valve 50, the trailer brake valve switch 56 is set to an electrically open position so that no electrical signal (e.g., about 0 Volts) is transmitted to the electrical communication port 82c (e.g., the binary signal from the trailer brake valve switch 56 is off). If, on the other hand, the position of the trailer brake valve 50 is at, or beyond, the rotational position that was previously identified to produce the predetermined threshold pressure at the pneumatic delivery port 62 of the trailer brake valve 50, the trailer brake valve switch 56 is set to an electrically closed position so that an electrical signal (e.g., about 5 Volts) is transmitted to the electrical communication port 82c (e.g., the binary signal from the trailer brake valve switch 56 is on). Therefore, the electrical communication port 82c of the ECU 74 is capable of an electrical signal indicative of the delivery pressure in the delivery port 62 of the trailer brake valve 50.

As described above, the ECU 74 includes control logic (e.g., software) 90 capable of receiving at least one of the electrical signals indicative of the foot brake delivery pressure in the respective delivery ports 46a, 46b of the first (e.g., primary) and second (e.g., secondary) circuits 34a, 34b of the foot brake valve 34, receiving the electrical signal indicative of the trailer brake delivery pressure in the delivery port 62 of the trailer brake valve 50, and transmitting a signal from an electrical stop light control port (e.g., the electrical communication port 82d) for controlling the vehicle stop light 70 based on i) the at least one electrical signal indicative of the foot brake delivery pressure and ii) the electrical signal indicative of the trailer brake delivery pressure.

The predetermined threshold pressure is contemplated to be in a range between about 2 psi and about 6 psi. In one embodiment, the predetermined threshold pressure is about 4 psi.

Figure 2:
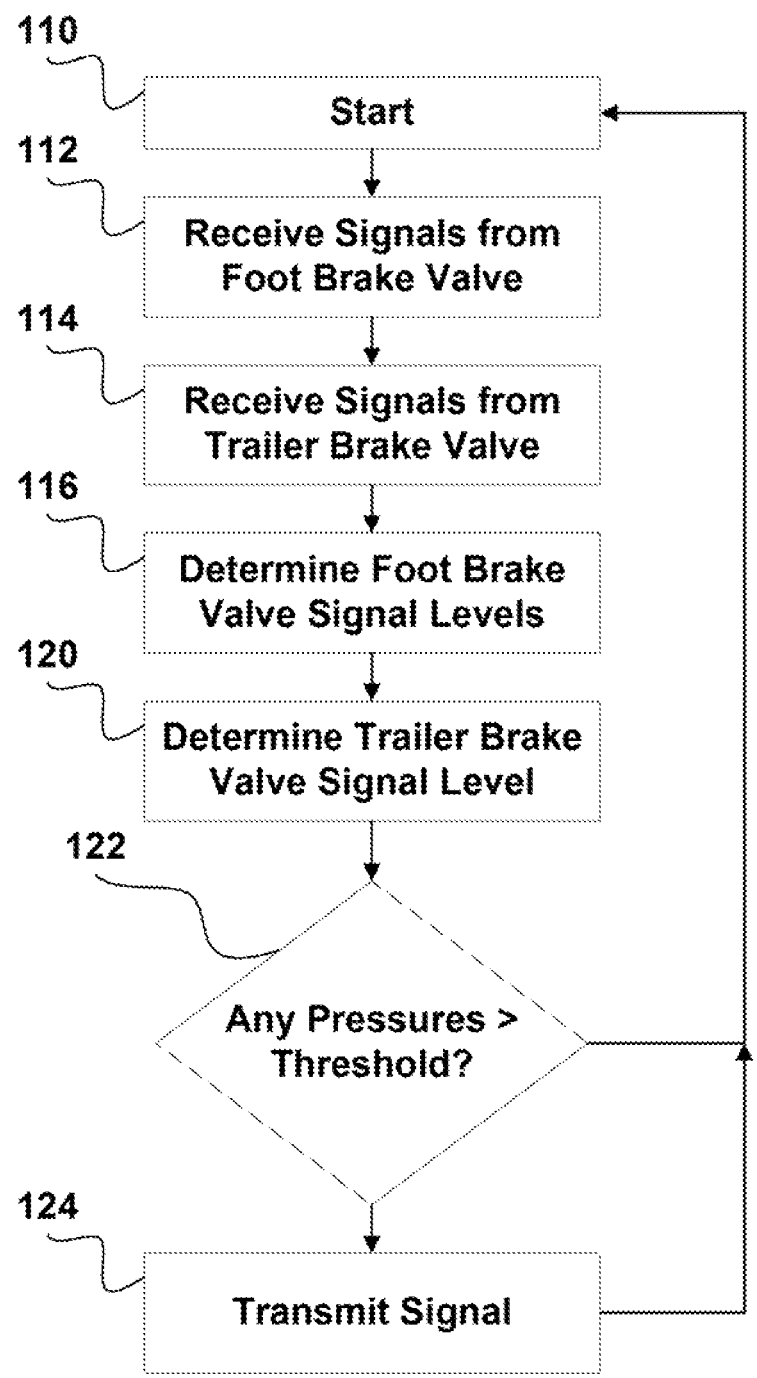
FIG. 2 is an exemplary methodology of controlling a stop light on a vehicle in accordance with one embodiment illustrating principles of the present invention.

With reference to FIG. 2, an exemplary methodology of the system shown in FIG. 1 for controlling the vehicle stop light 70 is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 2, a method for controlling the vehicle stop light 70 starts in a step 110. Then, in a step 112, the at least one electrical signal indicative of the foot brake delivery pressure in the respective delivery ports 46a, 46b of the first (e.g., primary) and second (e.g., secondary) circuits 34a, 34b of the foot brake valve 34 is/are received at the electrical communication ports 82a, 82b of the ECU 74. In a step 114, the electrical signal indicative of the delivery pressure in the delivery port 62 of the trailer brake valve 50 is received at the electrical communication port 82c of the ECU 74.

In a step 116, respective electrical levels (e.g., voltages) of the at least one electrical signal received at the electrical communication ports 82a, 82b are determined. In a step 120, an electrical level of the electrical signal received at the electrical communication port 82c is determined.

A determination is made, in a step 122, if the respective electrical levels of any of the electrical signals received at the electrical communication ports 82a, 82b, 82c indicate the respective pressure in any of the delivery ports 46a, 46b, 62 is above the predetermined threshold pressure. For example, as discussed above, it is determined in the step 122 whether the respective electrical levels of the signals received at the ports 82a, 82b is above a level indicating that the respective pressures in the delivery ports 46a, 46b is/are above the predetermined threshold pressure. In addition, as discussed above, it is determined in the step 122 whether the electrical signal received at the electrical communication port 82c from the trailer brake valve switch 56 is present, which indicates that the pressure in the delivery port 62 of the trailer brake valve 50 is above the predetermined threshold pressure.

If it is determined in the step 122 that the respective pressure in any of the delivery ports 46a, 46b, 62 is not above the predetermined threshold pressure, control returns to the step 110. Otherwise, if it is determined in the step 122 that the respective pressure in any of the delivery ports 46a, 46b, 62 is above the predetermined threshold pressure, control passes to a step 124.

In the step 124, a signal is transmitted from the electrical communication port 82d (e.g., the electrical stop light control port) to the power relay 72 for causing the power relay 72 to electrically activate the stop light 70. In one embodiment, if no signal is transmitted from the electrical communication port 82d (e.g., the electrical stop light control port) to the power relay 72, the power relay 72 does not electrically cause the stop light 70 to activate. In other words, if no signal is transmitted from the electrical communication port 82d (e.g., the electrical stop light control port) to the power relay 72 (e.g., absence of a signal), the power relay 72 does not electrically cause the stop light 70 to activate. In other words, the electrical communication port 82d (e.g., the electrical stop light control port) does not transmit a signal to the power relay 72 for ensuring the power relay 72 does not electrically cause the stop light 70 to activate. Conversely, if a signal is transmitted from the electrical communication port 82d (e.g., the electrical stop light control port) to the power relay 72 (e.g., presence of a signal), the power relay 72 does electrically cause the stop light 70 to activate.

Control then returns to the step 110.

As described above, the ECU 74 and control logic act as means for transmitting a signal from the electrical stop light control port 82d for controlling the vehicle stop light 70 based on the electrical signals indicative of the respective foot brake delivery pressures and the electrical signal indicative of the trailer brake delivery pressure.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A controller, comprising:
a foot brake valve electrical input port receiving an electrical signal indicative of a foot brake delivery pressure;
a trailer brake valve electrical input port receiving an electrical signal indicative of a trailer brake valve delivery pressure, which is controlled by an operator of an associated vehicle independent of the foot brake delivery pressure; and
control logic:
receiving the electrical signal indicative of the foot brake delivery pressure;
receiving the electrical signal indicative of the trailer brake valve delivery pressure;
based on an electrical level of the electrical signal indicative of the foot brake delivery pressure, determining if the foot brake delivery pressure is above a predetermined threshold pressure;
based on a presence of the electrical signal indicative of the trailer brake valve delivery pressure, determining if the trailer brake valve delivery pressure is above the predetermined threshold pressure; and
if at least one of the foot brake delivery pressure and the trailer brake valve delivery pressure is above the predetermined threshold pressure, transmitting a signal from an electrical stop light control port for controlling a vehicle stop light based on the electrical signal indicative of the foot brake delivery pressure and the electrical signal indicative of the trailer brake valve delivery pressure.

2. The controller as set forth in claim 1, wherein the control logic:
if at least one of the foot brake delivery pressure and the trailer brake valve delivery pressure is above the predetermined threshold pressure, transmitting the signal from the electrical stop light control port for activating the vehicle stop light.

3. The controller as set forth in claim 2, wherein the predetermined threshold pressure is about 4 psi.

4. The controller as set forth in claim 1, wherein the control logic:
determining that the foot brake delivery pressure is above the predetermined threshold pressure if the electrical level is at least 0.6067 Volts.

5. The controller as set forth in claim 1, wherein the control logic:
determining that the trailer brake valve delivery pressure is above the predetermined threshold pressure if the electrical signal indicative of the trailer brake valve delivery pressure is present.

6. The controller as set forth in claim 1, wherein the control logic:
based on the electrical signal indicative of the foot brake delivery pressure, determining if the foot brake delivery pressure is not above a predetermined threshold pressure;
based on the electrical signal indicative of the trailer brake valve delivery pressure, determining if the trailer brake valve delivery pressure is not above the predetermined threshold pressure; and
if neither the foot brake delivery pressure nor the trailer brake valve delivery pressure is above the predetermined threshold pressure, ensuring the signal from the electrical stop light control port is not transmitted so that the vehicle stop light is not activated.

7. The controller as set forth in claim 1, further including:
a second foot brake valve electrical input port receiving a second electrical signal indicative of a second foot brake delivery pressure;
wherein the control logic:
receiving the second electrical signal indicative of a second foot brake delivery pressure; and
transmitting the signal from the electrical stop light control port for controlling the vehicle stop light based on the electrical signal indicative of the foot brake delivery pressure, the second electrical signal indicative of a second foot brake delivery pressure, and the electrical signal indicative of the trailer brake valve delivery pressure.

8. The controller as set forth in claim 7, wherein the control logic:
based on a second electrical level of the second electrical signal indicative of the second foot brake delivery pressure, determining if the second foot brake delivery pressure is above the predetermined threshold pressure; and
if at least one of the foot brake delivery pressure, the second foot brake delivery pressure, and the trailer brake valve delivery pressure is above the predetermined threshold pressure, transmitting the signal from the electrical stop light control port for activating the vehicle stop light.

9. The controller as set forth in claim 1, wherein:
the trailer brake valve electrical input port receives the electrical signal from a movable control, the electrical signal being based on a position of the movable control and the trailer brake valve delivery pressure being set based on the position of the movable control.

10. A controller, comprising:
a foot brake valve electrical input port receiving an electrical signal indicative of a foot brake delivery pressure;
a trailer brake valve electrical input port receiving an electrical signal indicative of a trailer brake valve delivery pressure, which is controlled by an operator of an associated vehicle independent of the foot brake delivery pressure; and
control logic:
determining the foot brake delivery pressure based on the electrical signal indicative of the foot brake delivery pressure signal;
determining the trailer brake valve delivery pressure based on the electrical signal indicative of the trailer brake valve delivery pressure signal;
based on an electrical level of the electrical signal indicative of the foot brake delivery pressure, determining if the foot brake delivery pressure is above a predetermined threshold pressure;
based on a presence of the electrical signal indicative of the trailer brake valve delivery pressure, determining if the trailer brake valve delivery pressure is above the predetermined threshold pressure; and
if at least one of the foot brake delivery pressure and the trailer brake valve delivery pressure is above the predetermined threshold pressure, transmitting a signal from an electrical stop light control port for controlling a vehicle stop light based on the determined foot brake delivery pressure and the determined trailer brake valve delivery pressure.

11. The controller as set forth in claim 10, wherein the control logic:
   linearly determining the foot brake delivery pressure as being between about 0 psi and about 150 psi based on a range of possible electrical levels between about 0.5 Volts and about 4.5 Volts.

12. The controller as set forth in claim 10, wherein the control logic:
   if at least one of the foot brake delivery pressure and the trailer brake valve delivery pressure is above the predetermined threshold pressure, transmitting the signal from the electrical stop light control port for activating the vehicle stop light.

13. The controller as set forth in claim 10, further including:
   a second foot brake valve electrical input port receiving a second electrical signal indicative of a second foot brake delivery pressure;
   wherein the control logic:
      determining the second foot brake delivery pressure based on the second electrical signal indicative of the second foot brake delivery pressure signal; and
      based on a second electrical level of the second electrical signal indicative of the second foot brake delivery pressure, determining if the second foot brake delivery pressure is above the predetermined threshold pressure;
      if at least one of the foot brake delivery pressure, the second foot brake delivery pressure, and the trailer brake valve delivery pressure is above the predetermined threshold pressure, transmitting the signal from the electrical stop light control port for controlling the vehicle stop light based on the determined foot brake delivery pressure, the second foot brake delivery pressure, and the determined trailer brake valve delivery pressure.

14. The controller as set forth in claim 13, wherein the control logic:
   determining the foot brake delivery pressure based on the electrical level of the electrical foot brake delivery pressure signal; and
   determining the second foot brake delivery pressure based on the second electrical level of the second electrical foot brake delivery pressure signal.

15. The controller as set forth in claim 14, wherein the control logic:
   linearly determining the foot brake delivery pressure as being between about 0 psi and about 150 psi based on a range of possible electrical levels between about 0.5 Volts and about 4.5 Volts;
   linearly determining the second foot brake delivery pressure as being between about 0 psi and about 150 psi based on the range of possible electrical levels between about 0.5 Volts and about 4.5 Volts; and
   if at least one of the foot brake delivery pressure, the second foot brake delivery pressure, and the trailer brake valve delivery pressure is above the predetermined threshold pressure, transmitting the signal from the electrical stop light control port for activating the vehicle stop light.

16. A system for controlling a vehicle stop light, the system comprising:
   a tractor portion including tractor service brakes;
   a trailer portion including trailer service brakes;
   a foot brake valve including a foot brake valve delivery port delivering service brake pressure to both the tractor service brakes and the trailer service brakes;
   a foot brake sensor sensing the service brake pressure in the foot brake valve delivery port;
   a trailer brake valve, including:
      a trailer brake valve delivery port delivering service brake pressure to the trailer service brakes; and
      a movable control positioned to control the service brake pressure in the trailer brake valve delivery port;
   a trailer brake sensor sensing a position of the movable control;
   a vehicle brake light electrically controlled based on the respective service brake pressures in the foot brake valve delivery port and the trailer brake valve delivery port; and
   a controller including:
      a foot brake valve electrical input port receiving an electrical signal indicative of the service brake pressure in the foot brake valve delivery port from the foot brake sensor;
      a trailer brake valve electrical input port receiving an electrical signal indicative of the trailer brake delivery pressure from the trailer brake sensor; and
      control logic:
         receiving the electrical signal indicative of the foot brake delivery pressure;
         receiving the electrical signal indicative of the trailer brake delivery pressure; and
         based on an electrical level of the electrical signal indicative of the foot brake delivery pressure, determining if the foot brake delivery pressure is above a predetermined threshold pressure;
         based on a presence of the electrical signal indicative of the trailer brake delivery pressure, determining if the trailer brake delivery pressure is above the predetermined threshold pressure; and
         if at least one of the foot brake delivery pressure and the trailer brake delivery pressure is above the predetermined threshold pressure, transmitting a signal from an electrical stop light control port for controlling a vehicle stop light based on the electrical signal indicative of the foot brake delivery pressure and the electrical signal indicative of the trailer brake delivery pressure.

17. The system for controlling a vehicle stop light as set forth in claim 16, wherein:
   the electrical signal indicative of the service brake pressure in the trailer brake valve delivery port indicates the service brake pressure in the trailer brake valve delivery port is above a predetermined threshold pressure when the position of the movable control is beyond a predetermined position.

18. The system for controlling a vehicle stop light as set forth in claim 16, wherein the control logic is further adapted to:
   determine if the trailer brake delivery pressure is above a predetermined threshold pressure based on the presence of the electrical trailer brake delivery pressure signal.

19. The system for controlling a vehicle stop light as set forth in claim 18, wherein the control logic is further adapted to:
   linearly determine the foot brake delivery pressure as being between about 0 psi and about 150 psi based on a range of possible electrical levels between about 0.5 Volts and about 4.5 Volts.

20. A method for controlling a vehicle stop light, the method comprising:

receiving an electrical signal indicative of a foot brake delivery pressure;

receiving an electrical signal indicative of a trailer brake valve delivery pressure, which is controlled by an operator of an associated vehicle independent of the foot brake delivery pressure;

based on an electrical level of the electrical signal indicative of the foot brake delivery pressure, determining if the foot brake delivery pressure is above a predetermined threshold pressure;

based on a presence of the electrical signal indicative of the trailer brake valve delivery pressure, determining if the trailer brake valve delivery pressure is above the predetermined threshold pressure; and if at least one of the foot brake delivery pressure and the trailer brake valve delivery pressure is above the predetermined threshold pressure, transmitting a signal for controlling a vehicle stop light based on the electrical signal indicative of the foot brake delivery pressure and the electrical signal indicative of the trailer brake valve delivery pressure.

21. The method for controlling a vehicle stop light as set forth in claim 20, further including:

if at least one of the foot brake delivery pressure and the trailer brake valve delivery pressure is above the predetermined threshold pressure, transmitting the signal from the electrical stop light control port for activating the vehicle stop light.

22. The method for controlling a vehicle stop light as set forth in claim 20, further including:

determining that the foot brake delivery pressure is above the predetermined threshold pressure if the electrical level is at least 0.6067 Volts.

23. The brake controller as set forth in claim 20, further including:

receiving a second electrical signal indicative of a second foot brake delivery pressure;

based on a second electrical level of the second electrical signal indicative of the foot brake delivery pressure, determining if the second foot brake delivery pressure is above the predetermined threshold pressure; and if at least one of the foot brake delivery pressure, the second foot brake delivery pressure, and the trailer brake valve delivery pressure is above the predetermined threshold pressure, transmitting the signal for controlling the vehicle stop light based on the electrical signal indicative of the foot brake delivery pressure, the second electrical signal indicative of the second foot brake delivery pressure, and the electrical signal indicative of the trailer brake valve delivery pressure.

24. A controller, comprising:

a foot brake valve electrical input port receiving an electrical signal indicative of a foot brake delivery pressure;

a trailer brake valve electrical input port receiving an electrical signal indicative of a trailer brake valve delivery pressure, which is controlled by an operator of an associated vehicle independent of the foot brake delivery pressure; and means for transmitting a signal from an electrical stop light control port for controlling a vehicle stop light based on the electrical signal indicative of the foot brake delivery pressure and the electrical signal indicative of the trailer brake valve delivery pressure.

* * * * *